No. 801,798. PATENTED OCT. 10, 1905.
G. B. LAMB.
TUBE FORMING MACHINE.
APPLICATION FILED SEPT. 1, 1904.
7 SHEETS—SHEET 4.
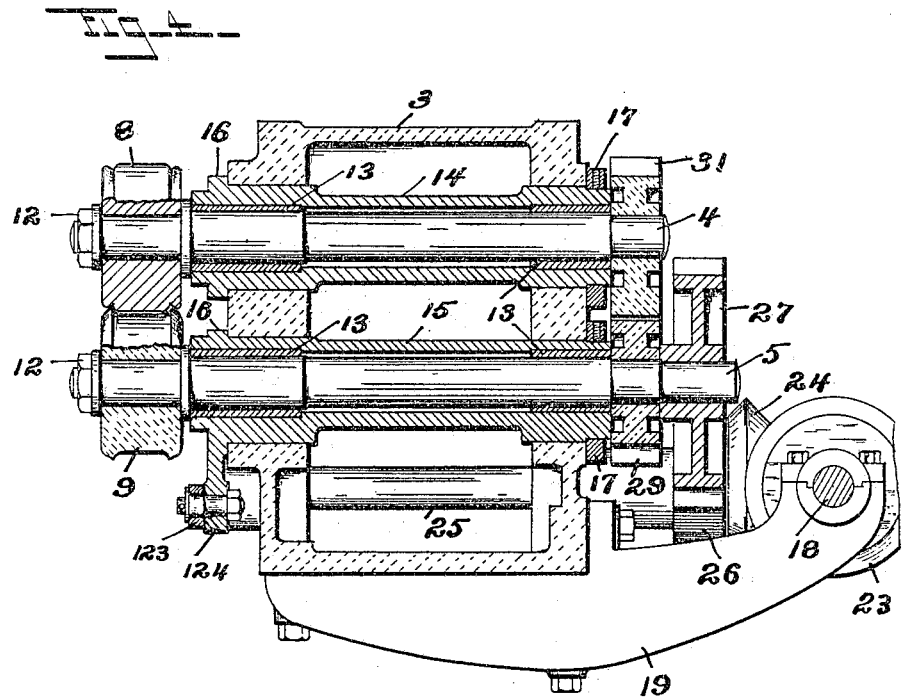
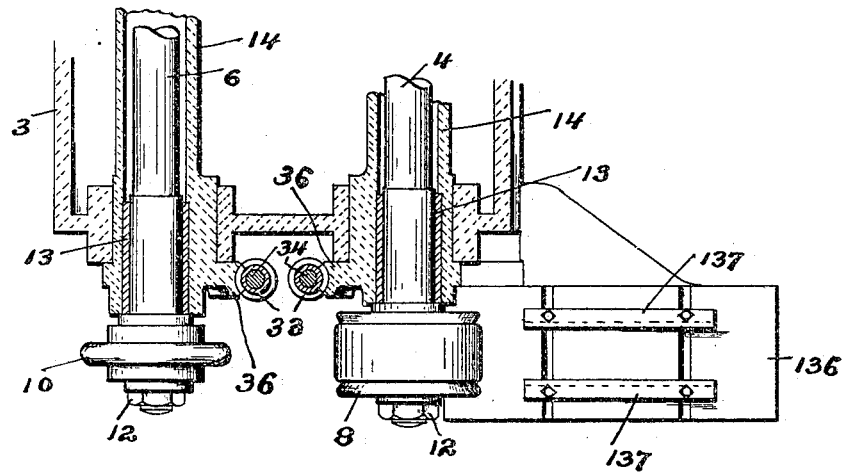
Witnesses
J. P. Lajon
Florence H. Work
Inventor.
George B. Lamb
by George E. Hall
Attorney No. 801,798. PATENTED OCT. 10, 1905.
G. B. LAMB.
TUBE FORMING MACHINE.
APPLICATION FILED SEPT. 1, 1904.
7 SHEETS—SHEET 5.
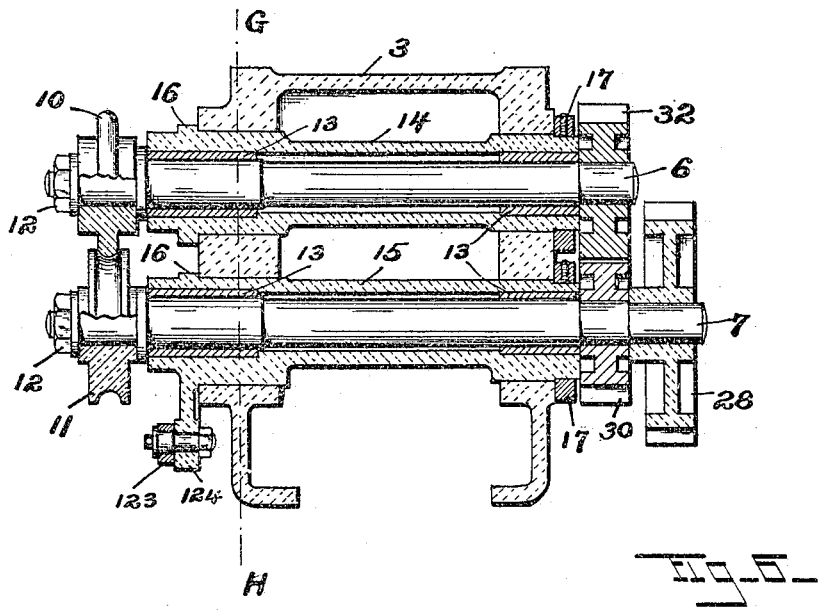
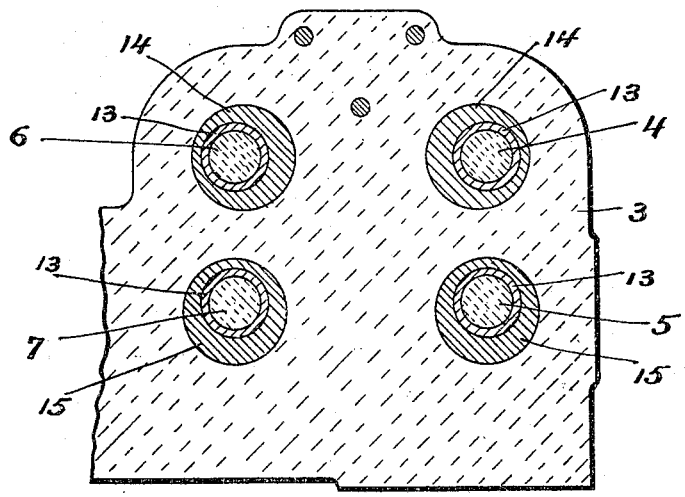
Witnesses.
J. P. Dejon
Florence H. Monk
Inventor.
George B. Lamb
by George E. Hall
Attorney

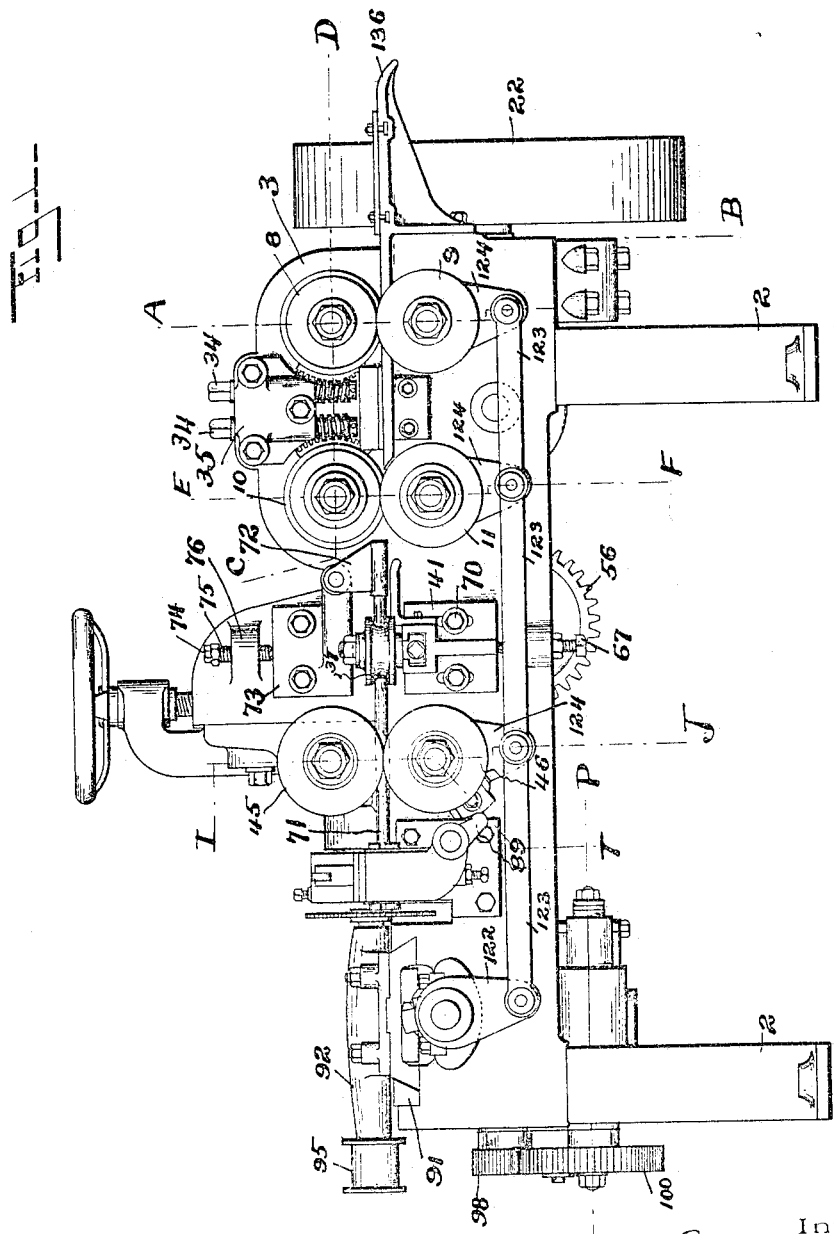

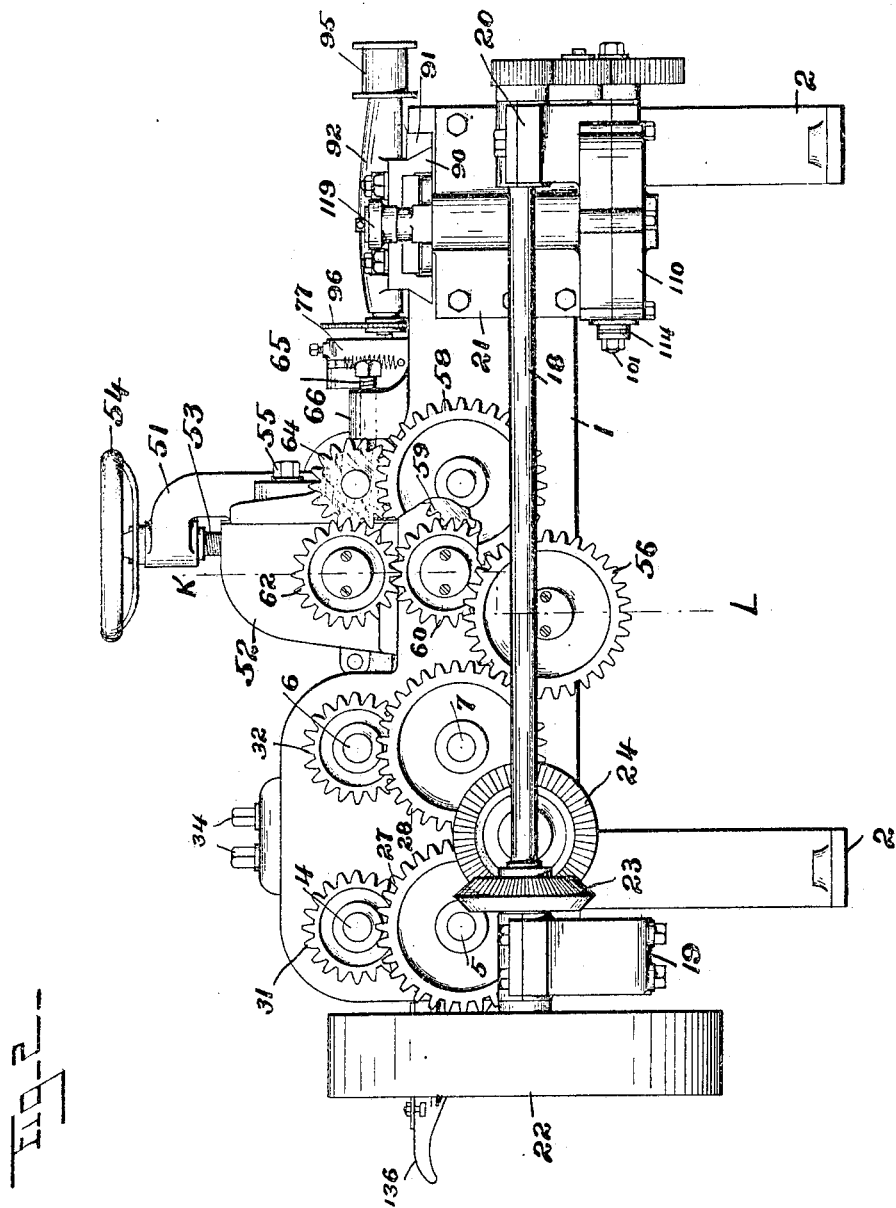

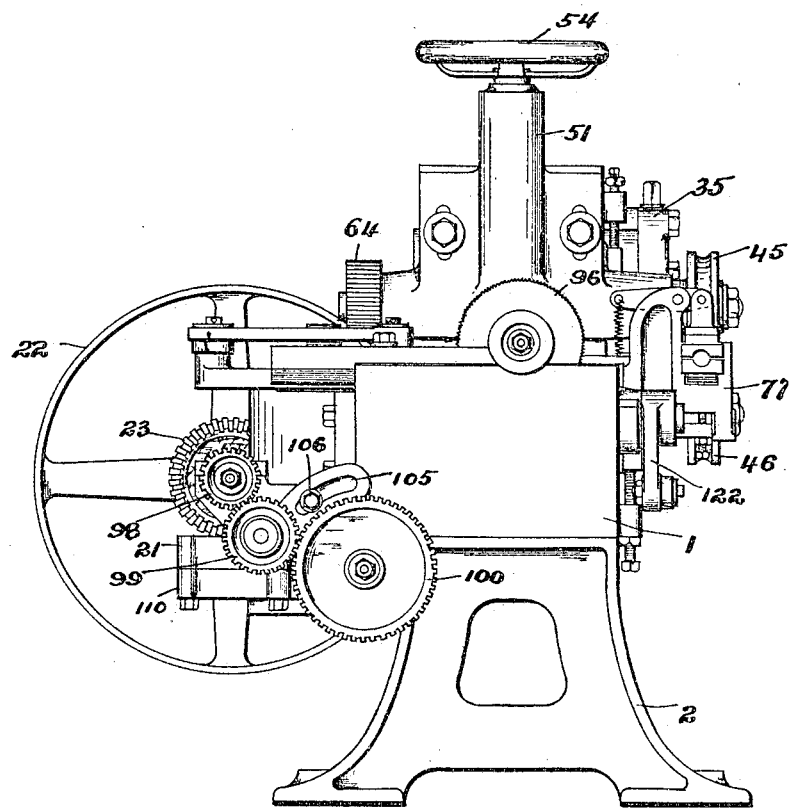

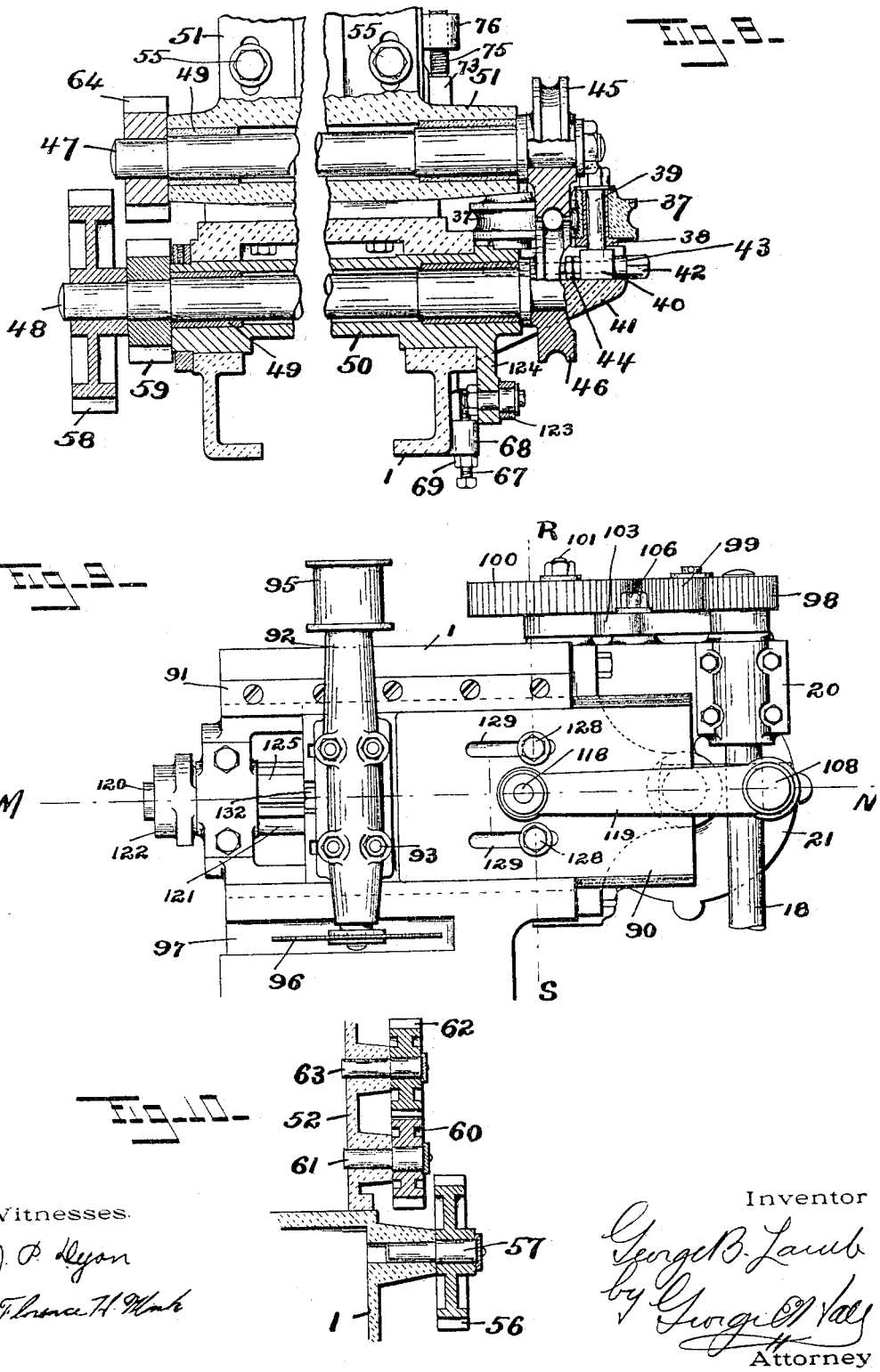

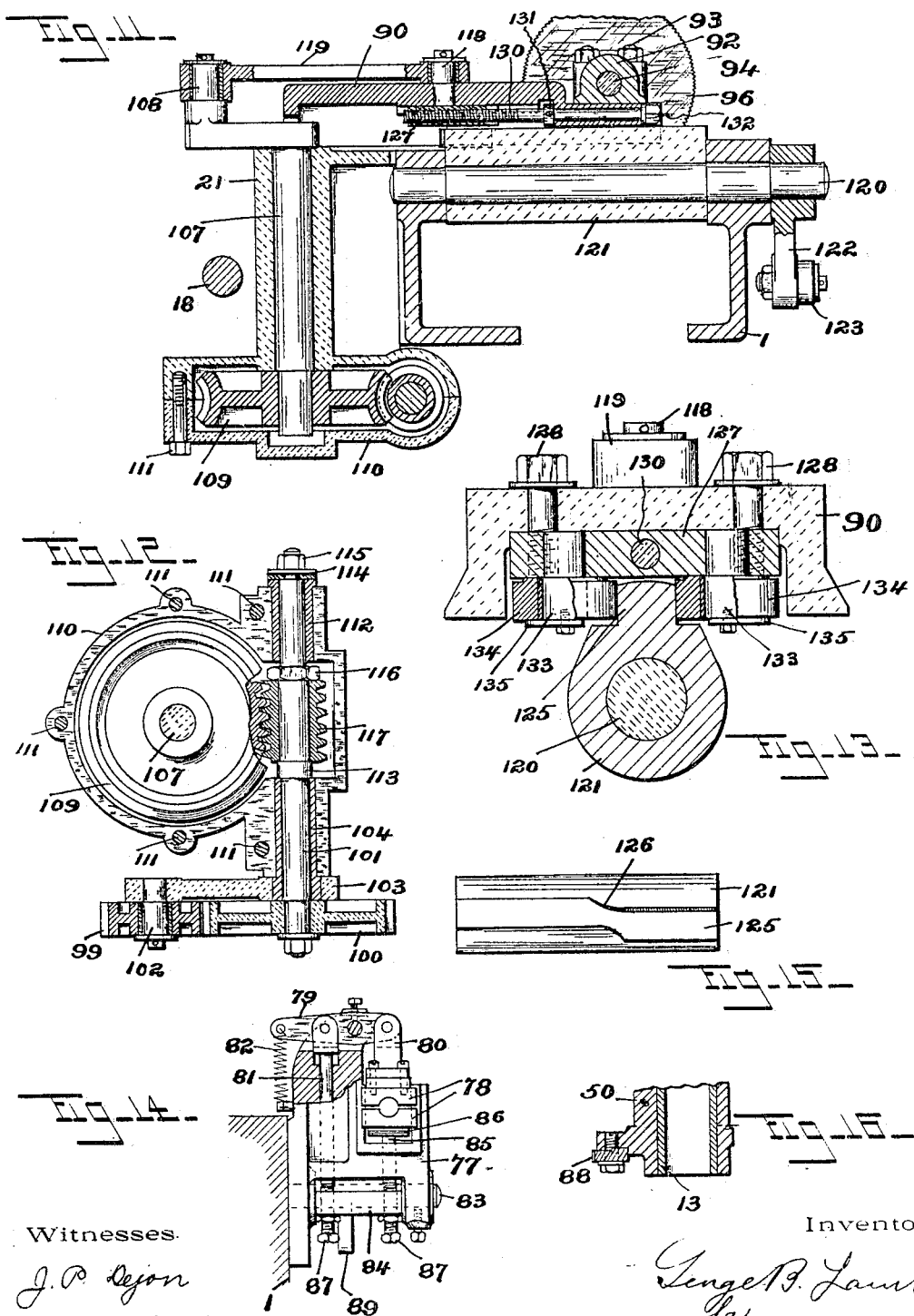

UNITED STATES PATENT OFFICE.

GEORGE B. LAMB, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

TUBE-FORMING MACHINE.

No. 801,798.    Specification of Letters Patent.    Patented Oct. 10, 1905.

Application filed September 1, 1904. Serial No. 222,925.

*To all whom it may concern:*

Be it known that I, GEORGE B. LAMB, a citizen of the United States, residing at Waterbury, in the county of New Haven and State of Connecticut, have invented certain new and useful Improvements in Tube-Forming Machines, of which the following is a specification, reference being had therein to the accompanying drawings.

My invention relates to new and useful improvements in tube-forming machines of that type wherein a flat strip of metal is passed through successive pairs of rolls which severally partially fold the same until the strip is folded into and becomes a perfect tube.

The object of my invention, among other things, is to construct a tube-forming machine of this general character in which there will be the fewest possible operations, means for automatically cutting the tubes when completed into predetermined lengths, and to accomplish these with mechanism that will operate automatically, of few parts, so designed as to be economically constructed, readily assembled, and produced at the minimum cost.

To these and other ends my invention consists in the tube-forming machine having certain details of construction and combination of parts, as will be hereinafter described, and more particularly pointed out in the claims.

Referring to the drawings, in which like numerals of reference designate like parts in the several figures, Figure 1 is a front view of my improved machine complete. Fig. 2 is a rear view thereof. Fig. 3 is an end view. Fig. 4 is a sectional elevation through the first pair of rolls upon line A B of Fig. 1. Fig. 5 is a fragmentary sectional plan view of the roll-housing, the first and second pairs of rolls, and parts adjacent thereto upon line C D of Fig. 1. Fig. 6 is a sectional elevation through the center of the second pair of rolls upon line E F of Fig. 1. Fig. 7 is a sectional elevation of the housing or frame for the first two pairs of rolls, taken upon line G H of Fig. 6. Fig. 8 is a fragmentary sectional elevation through the center of the fourth pair of rolls, taken upon line I J of Fig. 1. Fig. 9 is a plan view of the cut-off mechanism. Fig. 10 is a fragmentary view of the bed of the machine and the housing of the fourth pair of rolls, taken upon line K L of Fig. 2. Fig. 11 is a sectional elevation of the cut-off mechanism, taken upon line M N of Fig. 9. Fig. 12 is a sectional plan view of the cut-off worm and worm-gear with its operating mechanism, taken upon line O P of Fig. 1. Fig. 13 is an enlarged transverse sectional view of the cut-off mechanism, taken upon line R S of Fig. 9. Fig. 14 is an end elevation of the grip mechanism, partly in section. Fig. 15 is a plan view of the rockshaft cam; and Fig. 16 is a fragmentary view of the grip-cam, taken upon line T of Fig. 1.

My invention is embodied in mechanism whereby a flat strip of metal is passed between a pair of rolls which turn up the outer edges thereof, then between a pair of rolls which bend the same lengthwise in the middle, then between a pair of idler-rolls which operate upon the sides of the upwardly-projecting portion and fold the same over, then between a pair of finishing-rolls, which completes the tube. The rolls are now actuated so that one of each of said pairs of rolls is moved away from the metal strip, severing its frictional engagement therewith, and thereby discontinuing the passing or feeding of said strip between the rolls, and hence the forming operation. During this period a grip mechanism engages the finished tube and holds it rigidly while a saw mechanism automatically operated advances and cuts off a length therefrom, which drops away from the machine into a receptacle conveniently arranged to receive it, after which the saw mechanism is withdrawn, the grip mechanism released, and the rolls again actuated so as to frictionally engage the metal strip and the several operations proceed as before.

In the practice of my invention I provide a bed 1, which is supported on both ends by suitable legs 2, and preferably formed integral therewith upon one end thereof is a roll-housing 3, within which the first and second pairs of rolls are mounted.

The numerals 4, 5, 6, and 7 designate the spindles of the upper and lower rolls of the first and second pairs of rolls, respectively, upon the outer ends of which the rolls 8, 9, 10, and 11 are respectively secured by means of the nuts 12. Each of said spindles is rotatably mounted within bushings 13, that are fixed within the sleeves 14 and 15, which sleeves are journaled in the housing 3 and held against endwise movement by the integral collar 16 and separable collars 17. These spindles are mounted in said sleeves with the axes thereof eccentric to the axes of said sleeves, so that rotation of said sleeves in the housing 3 will cause the spindles to move in a rotary path about the axes of said sleeves, the purpose of which will be hereinafter described. The mechanism by which these spindles are rotated includes the main shaft 18, journaled at one end in the bracket 19, fixed to the bed 1, and at the other end in the box 20, formed integral with the cut-off bracket 21 and which is rotated by a belt engaging the pulley 22. Upon this shaft is fixed a miter-gear 23, engaging a miter-gear 24, fixed on a shaft 25, journaled in the bed 1. Fixed on said shaft 25 is a pinion 26, (see Fig. 4,) which meshes into and drives the gears 27 and 28 on the shafts 5 and 7, respectively. Secured on the shafts 5 and 7 are the pinions 29 and 30, which mesh into and drive the pinions 31 and 32 on the shafts 4 and 6, respectively. All the gears and pinions above mentioned are formed with special involute teeth of sufficient depth to permit a limited movement of the axes of the gears and pinions in relation to each other. The sleeves 14 are rotated in their journals by means of the worms 33, which engage worm-sectors 36, integral with the said sleeves. (See Figs. 1 and 5.) These worms are fixed on the lower ends of the worm-shafts 34, which are mounted within a block 35, rigidly secured to the front of the housing 3, and provided with angular heads, whereby they may be conveniently rotated with a wrench or other similar means.

The third pair of idler-rolls is mounted with their axes at substantially a right angle to the axes of the other rolls and are rotated by friction. These rolls are designated 37 and are rotatable upon sleeves 38, which are held rigid by the studs 39, having an angular head 40, slidable within a T-groove in the upper face of the roll-bracket 41, and are connected with each other by a threaded rod 42, also having an angular head whereby the same may be grasped and rotated with a wrench or other convenient means. This rod is provided with a collar 43 and jam-nuts 44 on either side of the outer bolt 39, so that said rod rotates freely in the head of the outer bolt, but threaded through the head of the bolt 39 upon the inner roll, so that by rotation of the said threaded rod the rolls are moved toward and away from each other, as desired. The bracket 41 is secured by the bolts 70, which pass therethrough and are threaded into the frame 1, and adjusted vertically by the bolt 67, which is threaded through the lug 68 upon the side of the frame 1, with its point impinging against the bottom edge of said bracket, a jam-nut 69 upon said bolt holding the same against accidental rotation.

The fourth pair of rolls are designated 45 and 46 and are mounted upon spindles 47 and 48, similar in size and structure to the spindles 4 and 5 and rotatable within bushings 49. The spindle 48 is rotatable inside of the sleeve 50, of substantially the same construction as the sleeve 15, which is mounted within the bed 1 (see Fig. 8) with the axis of said spindle eccentric to the axis of said sleeve. The spindle 47 is rotatable within a saddle 51, which is vertically adjustable upon the housing 52, securely fixed to the bed of the machine. The vertical adjustment just referred to is obtained by means of the spindle 53, which is threaded into the housing 52 and rotated by the hand-wheel 54, the saddle being held in any of its adjusted positions by the bolts 55, which pass through elongated slots therein and are threaded into said housing, and a bolt 65, (see Fig. 2,) which is threaded through a lug 66 upon the bed, with the end of said bolt impinging against the side of the saddle. The mechanism for rotating the spindles 47 and 48 comprises the gear 56, rotatably mounted upon a stud 57, projecting laterally from the rear of the bed 1 and meshing into the teeth of gear 28; a gear 58, fixed upon the spindle 48, the teeth of which mesh into and are driven by the gear 56; a pinion 59, also fixed to said spindle 58; a pinion 60, mounted upon a stud 61, projecting laterally from the rear of the housing 52, the teeth of which mesh into the pinion 59, (see Fig. 2;) a pinion 62, mounted upon a stud 63, fixed in the rear face of said housing 52 and the teeth of which mesh into those of the pinion 60, and a pinion 64, fixed upon the spindle 47 and the teeth of which mesh into and the gear driven by the pinion 62. All of the gears and pinions just referred to are provided with the special form of involute teeth of more than the ordinary depth, whereby the axes of the several gears and pinions may be moved in relation to each other, if desired. The power transmitted from the gear 28 passes into the gear 56 and thence to the gear 58, rotating the spindle 48 and pinion 59. From the pinion 59 the power is transmitted to the idler-pinion 60 and through it to the idler-pinion 62, from which it is transmitted to the pinion 64 upon the spindle 47. By means of the shape of the teeth, as above mentioned, it will be noted that the spindle 47 can be moved vertically within a limited range without disengaging the teeth of the pinion 64 from those of the idler-pinion 62 and the spindle 48 can be moved upon its eccentric mounting without disengagement of the teeth upon the pinion 59 with those of the idler-pinion 60.

While I do not deem it essential, I think it is advantageous to complete the tube-forming operation over a triblet, and a convenient form of mechanism for accomplishing this end is shown in the drawings, wherein the numeral 71 designates the triblet, which is held suspended between the third and fourth pairs of rolls and the gripping mechanism hereinafter described by the arm 72, that is pivotally connected to a bracket 73, adjustably secured to the front of the housing 52 by means of the screws 74 and 75, the screw 74 being threaded within the screw 75 and the screw 75 threaded in the lug 76 upon the said housing.

The grip mechanism comprises the bracket 77, secured upon the front of the bed 1 adjacent to the fourth pair of rolls; a pair of grip-jaws 78, that are vertically movable within said bracket. (see Fig. 14;) the lever 79, pivotally mounted midway of its length; a connection 80 joining the upper of said jaws 78 with one end of the lever 79; a vertically-movable plunger 81, secured at its upper end to the lever 79; spring 82, connected at one end to said lever and at the other with a fixed part upon said bracket, whereby the normal tension of said spring will draw the rear end of the lever downwardly; a rock-shaft 83, mounted within said bracket; a rock-arm 84, fixed thereto; a vertically-movable plunger 85; the flat spring 86 between the end of said plunger 85 and the under side of the lower jaw 78; screws 87, threaded through the rock-arm 84 in a line with the plungers 81 and 85, with their points engaging the lower ends of said plungers, and a grip-cam 88, adjustably secured to the sleeve 50, which cam is in the same vertical plane as the cam-arm 89, fixed on the rock-lever 84.

In operation the rotation of the sleeve 50 moves the grip-cam 88 in a rotary path and through the cam-arm 89 imparts a rocking movement to the rock-lever 84, and by reason of the engagement of the bolts 87 therein with the ends of the plungers 81 and 85 the jaws are caused to move toward each other and impinge against the tube sufficiently to hold it rigidly. The reverse movement of the sleeve 50 releases the cam from the cam-arm 89, and the springs 82 and 86 return the jaws to their original positions, releasing their grip upon the tube.

Transversely movable within the top of the bed 1 is the cut-off slide 90, which is held therein by the gib 91, and adjustably secured thereto by the bolts 93 is the standard 92, within which the saw-arbor 94 is rotatably mounted, having on one end a pulley 95, which is engaged by a belt, and upon the other end is secured a circular saw 96, which rotates within a recess 97 in the top of the bed. The cut-off slide is actuated from the main shaft 18, the gear 98, fixed upon the end thereof, engaging with an intermediate gear 99, that meshes into and drives a gear 100, that is fixed upon the end of the worm-shaft 101. Intermediate gear 99 is rotatably mounted upon a stud 102, fixed within an arm 103, movable upon the sleeve or bushing 104. In this arm is an elongated slot 105, concentric with the shaft 101, whereby said arm and intermediate gear may be adjusted concentrically thereto and secured in any of its adjusted positions by the bolt 106, which is threaded into the bracket 21.

For purposes hereinafter to be described it is advantageous that the speed of rotation of the main shaft 18 and worm-shaft 101 should be variable, and this is accomplished by substituting various-sized gears, as desired, in place of gears 98 and 100, and concentric adjustment of the arm 103 permits the use of intermediate gears of varying diameters and insures the intermeshing of said intermediate gears with both of said gears 98 and 100.

Rotatable within the bracket 21 is the crank-shaft 107, having the crank-pin 108 preferably formed integral therewith and having fixed upon its lower end a worm-gear 109, which is rotatable within a recess formed between the bottom of the bracket 21 and a cover 110, secured thereto by bolts 111. The shaft 101 is rotatable within the sleeves or bushings 104 and 112, both of which are secured between the bottom of said bracket 21 and the cover 110, and is held against endwise movement by the collar 113, washers 114, and nut 115. Fixed upon said shaft 101, between the collar 113 and the nut 116, is the worm 117, which meshes into and drives the worm-gear 109. Projecting upwardly from the top of the cut-off slide is the pin 118, and uniting said pin with the crank-pin 108 is the connection 119.

It is apparent that by the rotation of the shaft 18 through the gears 98, 99, and 100, worm 117, and worm-gear 109 the shaft 107 is rotated and the crank-pin 108 moves in a rotary path about said shaft and through the connection 119 with the cut-off slide a reciprocating movement is imparted to the cut-off slide and the saw connected therewith. The speed of movement of the cut-off slide 90 determines the length of tube that will be formed before the cutting-off operation begins, and to accommodate this movement whereby tubes of different lengths may be cut off gears of varying pitch are substituted for the gears 98, 99, and 100, so that the desired speed of movement of the crank-shaft 107 is secured from the main shaft 18, that continuously rotates at a uniform speed.

The mechanism for imparting a slight rotary movement to the several sleeves 15 and 50 comprises the rock-shaft 120, which is journaled within the bed 1 and has a cam 121 fixed thereto, a crank-arm 122 on said shaft, and links 123, which severally connect said crank-arm with the arms 124, integral with each of said sleeves. The cam 121 is provided upon its upper surface with a radially-projecting fin 125, which is offset at 126 (see Fig. 15) a sufficient distance to impart the proper rocking movement to said shaft 120.

Upon the under side of the slide 90 is a cam-block 127, which is adjustably secured thereto by the bolts 128, which pass through the elongated slots 129 and are threaded in said block, an adjustment of said block being obtained by the shaft 130, (see Fig. 11,) which is threaded therein and rotatably mounted in the cut-off slide between the collar 131 and the head 132, which is preferably angular in cross-section, whereby it may be conveniently rotated with a wrench or other similar means. Fixed in said block and projecting downwardly therefrom are the studs 133, upon which are rotatably mounted the cam-rolls 134, which engage either side of the fin 125 upon the cam 121 and are held against dislodgment by the plates 135, that are secured to the end of the studs 133. The rolls 134 by reason of their connection with the cut-off slide 90 move in a straight path, and so long as said rolls engage the straight portions of the fin 125 no rocking movement is imparted to the cam 121; but as soon as the rolls reach the offset 126 they cause said cam to shift its position about its axis and thereby impart a rocking movement to the shaft 120, which, through the links 123, imparts a slight rocking movement to the sleeves 15 and 50.

In operation a strip of flat sheet metal is passed over the table 136 between the adjustable guides 137, then between the first pair of rolls, (designated 8 and 9,) at which time the edges of the strip are curled upwardly without affecting the intermediate portion of said strip, then between the second pair of rolls, (designated 10 and 11,) which act upon the aforesaid intermediate portion of the strip and fold the strip so that it is substantially U shape in cross-section, with the upper ends of the sides thereof bent inwardly as a result of the action of the first pair of rolls thereon. The strip then passes between the third pair of rolls, (designated 37,) which act upon the sides of the U-shaped strip and fold the same slightly over the triblet 71, leaving the strip in a substantially circular form in cross-section, after which the strip passes between the fourth pair of rolls, (designated 45 and 46,) and which fold the strip into a perfect tube over the triblet 71. The now finished tube continues its progress and passes between the grip-jaws 78, and at the proper time, which has been determined and fixed by the relative sizes of the gears 98 and 100, the cut-off slide is advanced and at the same time a rocking movement imparted to the shaft 120, and through the links 123 the sleeves 15 and 50 are rotated within their bearings, which cause the spindles of the lower rolls to move in a rotary path about the axes of said sleeves and away from the upper rolls, thus widening the space therebetween and removing the frictional engagement of said rolls with the metal strip. The rolls not then being in engagement with the metal strip, the tube-forming operation ceases; but the rolls themselves continue to rotate about their own axes. The movement of the sleeve 50 also actuates the grip-cam 88 and through it the grip mechanism, as above described, wherein the jaws 78 close upon the tube and hold the same rigidly. As the cut-off slide continues to advance the saw 96 engages the tube and cuts off a length therefrom that may be either removed manually or permitted to drop into a receptacle conveniently located to receive it. The sawing operation completed the cut-off slide is withdrawn, which movement again actuates the rock-shaft, returning it to its original position, and through it the sleeves 15 and 50 are rotated, and the several lower rolls are brought into engagement with the metal strip, and instantly the tube-forming operation is again begun and continued until the rock-shaft 121 is actuated as before described.

The positions of the upper rolls 8 and 10 are adjusted in relation to the lower rolls to accommodate various thicknesses of metal and their frictional contact with said metal by rotating the worm-shafts 34, which through the worms 33 rotate the sleeves 14 in their journals and by the eccentric mounting of the spindles therein cause the same to be moved toward and away from the lower roll within a limited degree, and the upper roll 45 is adjusted similarly by rotation of the wheel 54, which moves the saddle 51, as above described.

There are many minor changes and alterations that can be made within my invention aside from those herein suggested, and I would therefore have it understood that I do not limit myself to the exact construction herein shown and described, but claim all that falls fairly within the spirit and scope of my invention.

Having described my invention, what I claim as new, and desire to secure by Letters Patent, is—

1. In a tube-forming machine, the combination with tube-forming rolls; of means for rotating said rolls; and automatic means actuated by said rotating means for separating said rolls at predetermined periods without discontinuing the rotation thereof.

2. In a tube-forming machine, the combination with tube-forming rolls; means for rotating said rolls; and means, operated from the roll-rotating means, for moving one of said rolls toward and away from the other of said rolls while the same are being rotated.

3. In a tube-forming machine, the combination with one or more pairs of tube-forming rolls; of movable journals, within which said rolls are mounted; a connection between one of each of said pairs of journals; means for rotating said rolls; and means for actuating one of each of said pairs of rolls, whereby said rolls will be caused to be moved toward and away from the other of said rolls while the same are being rotated.

4. In a tube-forming machine, the combination with one or more pairs of rolls; means for rotating said rolls; means for eccentrically mounting one of each of said pairs of rolls; and automatic means for actuating said several eccentric mountings at one and the same time, whereby the roll connected therewith may be moved toward and away from the other of said rolls.

5. In a tube-forming machine, the combination with one or more pairs of tube-forming rolls; means for rotating the same; a movably-mounted sleeve for each of said rolls; a connection between one of each of said pairs of sleeves; means for eccentrically mounting one of each of said pairs of rolls in said sleeve; and means for imparting movement to said sleeve.

6. In a tube-forming machine, the combination with tube-forming rolls arranged in pairs; of means for rotating said rolls; a journaled sleeve for one of each of said pairs of rolls; a connection between said journaled sleeves; means for eccentrically mounting the spindles of said rolls in said sleeves; and means for imparting movement to said sleeves during the rotation of said rolls.

7. In a tube-forming machine, the combination with one or more pairs of roll-spindles; forming-rolls connected therewith; a journaled sleeve for each of said spindles and within which the same are eccentrically mounted; and independent means for actuating said rolls and for imparting movement to said sleeves at one and the same time.

8. In a tube-forming machine, the combination with one or more pairs of roll-spindles; rolls connected therewith; gear mechanism connecting said spindles, whereby the same are positively and continuously rotated; eccentric sleeves forming journals for said spindles; and means for imparting a rocking movement to one or more of said sleeves, said means being communicated to said sleeves through link connections.

9. In a tube-forming machine, the combination with roll means for forming a tube from a strip of metal; means for rotating said rolls; means, actuated from said rotating means, for moving said rolls toward and away from each other, whereby said rolls will either engage or disengage frictionally said strip and continue or discontinue the tube-forming operation during the rotation of said rolls.

10. In a tube-forming machine, the combination with tube-forming rolls; means for rotating said rolls; means for releasing the frictional engagement of said rolls upon the strip being formed into a tube; and means for severing the tube from the strip into predetermined lengths while the frictional engagement of said rolls has been released.

11. In a tube-forming machine, the combination with rolls; of means for rotating said rolls; means for varying the width of the space between said rolls while the same are being rotated; a saw mechanism; and means for actuating said saw mechanism, whereby the tubes will be severed from the strip into predetermined lengths.

12. In a tube-forming machine, the combination with tube-forming rolls; of means for rotating said rolls; a saw mechanism for cutting the tubes into predetermined lengths; and means for actuating said rolls, whereby the tube-forming operation will be discontinued during the cutting-off operation.

13. In a tube-forming machine, the combination with rolls; of means for continuously rotating said rolls; a saw mechanism; means for actuating the same, whereby the tubes will be cut into predetermined lengths; means for discontinuing the tube-forming operation during the sawing operation; and means for holding said tube rigid during said sawing operation.

14. In a tube-forming machine, the combination with tube-forming rolls; of means for eccentrically mounting the same; a cut-off mechanism; means for actuating said mechanism; and means for actuating said eccentric mounting, whereby the forming-rolls are moved away from each other and the tube-forming operation discontinued during the cut-off operation.

15. In a tube-forming machine, the combination with tube-forming rolls arranged in pairs; of means for rotating said rolls; eccentric sleeve-journals for one of the rolls in each of said pairs of rolls; a rock-shaft; means for actuating the same; and an operative connection between said rock-shaft and said eccentric sleeve-journals.

16. In a tube-forming machine, the combination with tube-forming rolls arranged in pairs; of means for rotating said rolls; eccentric sleeve-journals for one of the rolls in each of said pairs of rolls; a rock-shaft; crank-actuated mechanism for actuating said rock-shaft; and a connection between said rock-shaft and said eccentric sleeve-journals.

17. In a tube-forming machine, the combination with tube-forming rolls arranged in pairs; of means for rotating said rolls; eccentric sleeve-journals for one of the rolls in each of said pairs of rolls; a rock-shaft; a reciprocating slide having engagement with said rock-shaft; a rotary crank having a connection with said slide; means for rotating said crank-shaft; and an operative connection between said rock-shaft and eccentric sleeve-journals.

18. In a tube-forming machine, the combination with tube-forming rolls arranged in pairs; of means for rotating said rolls; eccentric sleeve-journals for one of the rolls in each of said pairs of rolls; a rock-shaft; a slide having engagement with said rock-shaft; means for imparting a reciprocating movement thereto; and an operative connection between said rock-shaft and eccentric sleeve-journals.

19. In a tube-forming machine, the combination with tube-forming rolls arranged in pairs; of means for rotating said rolls; eccentric sleeve-journals for one of the rolls in each of said pairs of rolls; a rock-shaft; a reciprocating slide having a cut-off mechanism mounted thereon; means for connecting said rock-shaft with said slide whereby said slide will move during a portion of its stroke without actuating said rock-shaft; and a connection between said rock-shaft and said eccentric sleeve-journals.

20. In a tube-forming machine, the combination with tube-forming rolls arranged in pairs; of means for rotating said rolls; eccentric sleeve-journals for one of the rolls in each of said pairs of rolls; a rock-shaft; a reciprocating cut-off mechanism; means for connecting said mechanism with said rock-shaft; means for varying the speed of movement of said cut-off mechanism; and a connection between said rock-shaft and said eccentric sleeve-journals.

21. In a tube-forming machine, the combination with tube-forming rolls arranged in pairs; of means for rotating said rolls; eccentric sleeve-journals for one of the rolls in each of said pairs of rolls; a rock-shaft; a reciprocating cut-off mechanism; means for connecting said mechanism with said rock-shaft; means for varying the speed of movement of said cut-off mechanism; a connection between said rock-shaft and said eccentric sleeve-journals; crank means for imparting movement to said cut-off mechanism; means for rotating said crank; and means for varying the speed of rotation thereof.

22. In a tube-forming machine, the combination with tube-forming rolls arranged in pairs; of means for rotating said rolls; eccentric sleeve-journals for one of the rolls in each of said pairs of rolls; a rock-shaft; an endwise-movable cut-off mechanism; means for connecting said mechanism with said rock-shaft; means for varying the speed of movement of said cut-off mechanism; a connection between said rock-shaft and said eccentric sleeve-journals; crank means for imparting movement to said cut-off mechanism; gear mechanism for rotating said crank-shaft; and means for varying the speed of movement of said crank-shaft.

23. In a tube-forming machine, the combination with tube-forming rolls; of means for rotating said rolls; mechanism for cutting the tubes into predetermined lengths; means for actuating said rolls whereby the tube-forming operation will be discontinued during the cutting-off operation; and means for rigidly gripping the tube during said cutting-off operation, said gripping mechanism being actuated from the mechanism which causes discontinuation of the tube-forming operation.

24. In a tube-forming machine, the combination with tube-forming rolls; of means for rotating said rolls; mechanism for cutting the tubes into predetermined lengths; a gripping mechanism; and means actuated through the action of the cutting-off mechanism for discontinuing the tube-forming operation during the cutting-off operation and for actuating the gripping mechanism at one and the same time.

25. In a tube-forming machine, the combination with one or more pairs of roll-spindles; tube-forming rolls connected therewith; a journaled sleeve for each of said spindles and within which the same are eccentrically mounted; a cut-off mechanism; means for connecting said cut-off mechanism with one of the eccentric sleeves of each of said pairs of rolls, whereby the same are actuated therefrom; and means for adjustably rotating the other sleeves of each of said pairs of rolls.

26. In a tube-forming machine, the combination with tube-forming rolls; of means for rotating said rolls; means for separating said rolls at predetermined periods without discontinuing the rotation thereof; and means for varying the length of said predetermined periods.

27. In a tube-forming machine, the combination with tube-forming rolls; of means for rotating said rolls; a cut-off mechanism; means for discontinuing the tube-forming operation during the cutting-off operation; and means for varying the speed of movement of said cut-off mechanism in relation to the tube-forming operation.

28. In a tube-forming machine, the combination with tube-forming rolls; of means for rotating said rolls; means for discontinuing the tube-forming operation while said rolls are rotating; a cut-off mechanism for severing the tubes into predetermined lengths during the discontinuation of the tube-forming operation; and means for varying the length of the tube-forming operation.

29. In a tube-forming machine, the combination with tube-forming rolls; of means for rotating said rolls; a cut-off mechanism; an operative connection between said cut-off mechanism and tube-forming rolls whereby the movement of said cut-off mechanism will either continue or discontinue the tube-forming operation according to the direction of movement thereof; and means for varying the length of the tube-forming operation in relation to said cut-off mechanism.

30. In a tube-forming machine, the combination with tube-forming rolls; of means for actuating said rolls; a cut-off mechanism for severing the rolled tube into predetermined lengths; and means for varying the length of the tube to be cut off, said means being controlled by the relative speed of movement of said cut-off mechanism with the tube-forming operation.

In testimony whereof I affix my signature in presence of two witnesses.

GEORGE B. LAMB.

Witnesses:
DAVID C. GRIGGS,
J. M. GALLOND.